United States Patent
Schroeder

(10) Patent No.: US 9,841,873 B1
(45) Date of Patent: Dec. 12, 2017

(54) PROCESS FOR REDUCING THE NUMBER OF PHYSICAL ACTIONS REQUIRED WHILE INPUTTING CHARACTER STRINGS

(71) Applicant: James Ernest Schroeder, Helotes, TX (US)

(72) Inventor: James Ernest Schroeder, Helotes, TX (US)

( * ) Notice: Subject to any disclaimer, the term of this patent is extended or adjusted under 35 U.S.C. 154(b) by 0 days.

(21) Appl. No.: 14/143,459

(22) Filed: Dec. 30, 2013

(51) Int. Cl.
*G06F 3/0482* (2013.01)
*G06F 3/0484* (2013.01)

(52) U.S. Cl.
CPC ........ *G06F 3/0482* (2013.01); *G06F 3/04842* (2013.01)

(58) Field of Classification Search
CPC ............................. G06F 3/0482; G06F 3/04842
See application file for complete search history.

(56) References Cited

U.S. PATENT DOCUMENTS

| | | | | |
|---|---|---|---|---|
| 6,377,965 B1* | 4/2002 | Hachamovitch | ...... | G06F 17/276 715/203 |
| 8,904,309 B1* | 12/2014 | Zhai | ...... | G06F 3/0237 715/773 |
| 9,122,376 B1* | 9/2015 | Brotherston | ...... | G06F 17/30637 |
| 2005/0198144 A1* | 9/2005 | Kraenzel | ...... | G06Q 10/107 709/206 |
| 2006/0256139 A1* | 11/2006 | Gikandi | ...... | G06F 17/276 345/689 |
| 2007/0061718 A1* | 3/2007 | Nurmi | ...... | G06F 3/0237 715/201 |
| 2008/0097748 A1* | 4/2008 | Haley | ...... | G06F 17/2785 704/9 |
| 2008/0235029 A1* | 9/2008 | Cross | ...... | G10L 15/22 704/275 |
| 2008/0243808 A1* | 10/2008 | Rieman | ...... | G06F 17/30985 |
| 2008/0266261 A1* | 10/2008 | Idzik | ...... | G06F 17/273 345/168 |
| 2008/0281583 A1* | 11/2008 | Slothouber | ...... | G06F 17/30867 704/10 |

(Continued)

OTHER PUBLICATIONS

Shieber, S.M., and Nelken R.; "Abbreviated Text Input Using Language Modeling." Natural Language Eng; 13(2):165-183; Jun. 2007.*

*Primary Examiner* — Andrea Long

(57) ABSTRACT

The present invention provides a process for inputting character strings which reduces the number of physical actions required by the user. In this process, the user is provided a rule or rules about which characters in a target character string are to be selected and corresponding mechanism or mechanisms are applied while searching a reference set of possible character strings to identify and present a subset of likely candidates. One illustrative rule is that the user is to select only the consonants in the target character string. One illustrative embodiment of the invention reduces the number of physical actions required by a user entering text into a device when using any of a plurality of input alternatives. A second illustrative embodiment of the invention reduces the number of physical actions required by a physically-disabled user entering text into a device using a virtual keyboard, scanning keyboard, or other assistive method for the purpose of standard text entry or communicative text or speech output.

3 Claims, 2 Drawing Sheets

(56) References Cited

U.S. PATENT DOCUMENTS

| | | | |
|---|---|---|---|
| 2009/0040184 A9* | 2/2009 | Pu | G01C 21/3611 345/171 |
| 2009/0043584 A1* | 2/2009 | Philips | G10L 13/08 704/260 |
| 2009/0058690 A1* | 3/2009 | Scott | G06F 3/0202 341/23 |
| 2009/0193334 A1* | 7/2009 | Assadollahi | G06F 17/276 715/261 |
| 2011/0060984 A1* | 3/2011 | Lee | G06F 17/276 715/261 |
| 2011/0061017 A1* | 3/2011 | Ullrich | G06F 3/016 715/780 |
| 2011/0087961 A1* | 4/2011 | Fitusi | G06F 17/276 715/261 |
| 2012/0324391 A1* | 12/2012 | Tocci | G06F 3/0237 715/773 |
| 2013/0046544 A1* | 2/2013 | Kay | G06F 3/04883 704/275 |
| 2013/0253906 A1* | 9/2013 | Archer | G06F 17/276 704/9 |
| 2013/0253908 A1* | 9/2013 | Zhai | G06F 17/276 704/9 |
| 2014/0025616 A1* | 1/2014 | Yoshida | G06F 3/023 706/46 |
| 2014/0163954 A1* | 6/2014 | Joshi | G06F 17/276 704/9 |
| 2014/0316784 A1* | 10/2014 | Bradford | G10L 15/18 704/245 |
| 2015/0040055 A1* | 2/2015 | Zhao | G06F 3/04886 715/773 |
| 2015/0058720 A1* | 2/2015 | Smadja | G06F 3/048 715/271 |
| 2015/0121285 A1* | 4/2015 | Eleftheriou | G06F 3/04842 715/773 |
| 2015/0160855 A1* | 6/2015 | Bi | G06F 3/04886 715/773 |
| 2015/0169975 A1* | 6/2015 | Kienzle | G06K 9/34 382/189 |

* cited by examiner

PROCESS FOR REDUCING THE NUMBER OF PHYSICAL ACTIONS REQUIRED WHILE INPUTTING CHARACTER STRINGS

BACKGROUND OF THE INVENTION

Technical Field

This invention relates generally to the field of text input technology. It is especially useful for use with virtual keyboards on small electronic devices requiring text input such as, but not limited to, computers, tablet computers, smart phones, laptop computers, personal digital assistants, etc. The invention is further related to the field of assistive technology as a process for improving a physically disabled person's speed for entering text while decreasing the number of required physical actions.

General Background

There is a need for faster and more accurate text entry. The traditional QWERTY keyboard was designed with assumptions about the number and size of the hands and fingers that would be involved while typing, and those assumptions do not transfer well to tiny hardware keyboards on some phones, computers, and personal digital assistants (PDAs), or to on-screen virtual keyboards available with most tablet computers, smart phones, and other small electronic devices that have become available over the past decade. Because of their small size and lack of sensory feedback such character string input methods are very difficult to use and force the user into a "hunt-and-peck" method or "two-thumbs" method. Other recent advances in communication technology such as email and text messaging are extremely popular, increasing the need for improved methods but not providing alternatives. In addition, while persons with physical disabilities use text input to generate speech synthesized output for communication, they often have trouble using even standard hardware keyboards, so there is an ongoing need to identify new methods that could speed text entry for that special population.

Most people who use text messaging already informally use abbreviations to speed text entry; the present invention utilizes a method for standardizing abbreviations so that they can be reliably used by a word prediction engine to quickly identify the target word or expression. While the person selecting characters uses abbreviations, the actual words are inputted, reducing the chances that the person receiving the message might misunderstand the message. The invention described herein builds on current methods of inputting character strings. Specific related technologies are described here because of their relevance for the invention: disambiguation, word prediction, on-screen "virtual" keyboards, and scanning keyboards, and other recent innovative text input approaches.

Background on Disambiguation.

Disambiguation refers to methods which attempt to detect what character or word is being inputted from ambiguous information, and is best discussed in the context of using a standard touchtone telephone keypad to enter text, where, for example selecting the "5" key could mean that the user is attempting to input a "j," "k," or "l." With one common such approach called "Multitap," the user presses the same key once or more to indicate the letter being inputted; for example, the use might tap the "5" key once to indicate "j," twice to indicate "k," or three times to indicate "l." In other similar approaches, the user successively or simultaneously presses two or more keys to indicate the desired letter; for example, a user might press the "6" (m-n-o key) followed by or simultaneously with the "*" key to indicate it is the first "m" letter that is to be inputted. Other disambiguation methods such as the "T9" method use numeric information about the key pressed to form a numeric representation of the word (e.g., the word "dog" would be "364"), then search a dictionary to determine words that match that pattern, and then offer the user the most probable such word, which the user can accept or reject to get the next most probable "364" word.

Background on Word Prediction.

Another significant existing technology relevant to the current invention is word prediction. Using a hardware or on-screen keyboard the user selects the first character of a desired target character string (e.g., the first letter of a word to be typed), word prediction searches a reference set of possible character strings and identifies those candidates which begin with the selected character. Because the reference set (or "dictionary") probably contains more such strings than could reasonably be displayed for selection, most word prediction programs present those strings with the highest associated frequency-of-use index. If the target string is presented, the user can select it for input, which typically is faster and requires fewer physical actions than selecting all the characters in the target string. If the target string is not presented for selection, the user selects the second character, third character, etc., until the target string is presented or the entire string has been directly inputted by the user. The better word prediction products have substantial built-in reference sets of commonly used words ("dictionaries"), which are used to prioritize identified candidate words. Also, as suggested in the preceding example, associated word frequency values often are included so that words can be presented in the order of their frequency of use (e.g., words used more frequently are presented at the top of vertical lists or on the left in horizontal lists). Learning options also are often available so that word frequency values can be adjusted to reflect a specific person's use of different words (e.g., if a word is infrequently used by the general population but used frequently by a specific user, its frequency value will change so that it appears more quickly for that user). Because of the awkwardness of using small telephone, PDA, or tablet computers, word prediction is often integrated into such products. Another important aspect of standard word prediction is that, if used properly, spelling accuracy can be increased because only correctly spelled words are included in the reference set of character strings which is searched for candidates. In addition, because the number of characters the user must select to input a word is reduced, the overall probability of the user accidentally selecting the wrong character is reduced.

A useful technology related to word prediction is generally called "abbreviation expansion." In this method, a short character string is entered in order to input a longer character string. For example, the user might type "xme" (the abbreviation or "encoding") which produces the longer character string "Hello, my name is Henry Smith" (the expansion). This is a technology in which the encodings and corresponding expanded text are stored in the reference set of candidate character strings (e.g., xme=Hello, my name is Henry Smith). While simple, it can save users numerous keystrokes and time if constructed well, and if the user can remember the abbreviations.

Background on Virtual Keyboard Technology.

Traditionally, the hardware keyboard has been the standard input mechanism for typing when using a computer.

However, many people (e.g., persons with disabilities, children, new typists, infrequent typists, or people using small electronic devices) can experience difficulty using hardware keyboards for a variety of reasons such as poor dexterity, poor tactile feedback, or unfamiliarity with the keyboard layout. One existing technology that can be useful is the virtual on-screen "virtual" software keyboard, wherein users are provided a graphic representation of a keyboard on the computer's display. Using a "point-and-click" input mode, a mouse or other pointer is used to type letters by clicking on the graphically displayed keys or by touching them with a finger or a stylus when a touch screen is available. When selected, the appropriate character typically is sent to a word processor, spread sheet, database, or some other open application program.

On-screen keyboards can be useful because the keys can be presented in a more meaningful way (e.g., an alphabetic layout instead of the traditional "QWERTY" layout), which can be easier to use for some people. Also, with an on-screen keyboard the names of the letters can be spoken (with synthesized or recorded speech) when they are selected which also can be useful for some people. In addition, pictures can be added to a key's face, and this can be helpful to some people (e.g., a picture of an "apple" on the "A" key). Finally, useful information can be presented when a key is "pointed at" with the pointer. For example, when a user points at the key with the label "A," the key's appearance can change; and a picture of an "apple" might appear, a new label "A as in Apple" might appear and be read aloud. All of these features can be especially useful to a person with spelling, reading, writing, or learning difficulties. Some people are unable to use a traditional hardware keyboard because of a physical disability. If they are able to use a pointer, then on-screen keyboards provide a very important computer-access tool. Also, some people have a more severe physical disability and for them, other strategies must be applied such as "switch scanning" techniques (see the next section). Finally, in addition to using virtual keyboards for traditional text input, another important application for virtual keyboards as well as for the invention described herein is in the selection of words and phrases for voice output using a speech synthesizer or other similar speech-generating system for the purpose of augmenting and assisting aural communication.

Background on "Scanning Keyboard" Technology.

A useful assistive technology for physically challenged users utilizes "switch scanning" input methods. While the point-and-click input mode is the best approach for many users, some people cannot accurately use a standard keyboard, a standard pointing device, or a touch screen. However, for most such individuals, some reliable single response usually can be identified and used to make a selection with a switch. Switches are available to capture a variety of responses more likely to be under the user's control such as the eye blink response, air puff or air sip response, etc. The single switch then can be used to select options on a display such as keys being "offered" on an on-screen keyboard or word being offered in a word prediction program. Such "scanning keyboards" (because they typically successively offer different rows, columns, or keys on an on-screen keyboard), allow the use of a simple switch to signal selection of a group of keys or individual key being offered.

In one such method called single-switch scanning, an on-screen keyboard offers different options at a constant rate, for example, every 2 sec. Typically, the user first selects the "row" of letters that contains the target letter and then selects the "column" or key, hence, this approach is called "row-column scanning." First, the top row of keys (i.e., containing Tab, Qu, W, E, R, etc.) is "highlighted" (e.g., its color changed, a box drawn around it, etc.), for the pre-established time period. Next, the second row is offered to the user, again by highlighting. If a user were typing the word "sunny," then the user would operate the switch to select the second row, because the first letter "s" is in the second row of a QWERTY keyboard. Next, the columns (i.e., keys) in that row are systematically highlighted from left to right. In this example, the user would wait until the letter "s" was highlighted, and then select it using the switch. Selection sends the selected character to the open application (perhaps a word processor), and resets the scanning method. If word prediction is present, selecting an initial "s" also would cause word prediction to present a list of probable words beginning with "s." The user then would select the first row (because it contains the next letter "u"), and then select the letter "u." After inputting "su," many word prediction programs would offer the word "sunny." If so, the user would wait until scanning offered the word prediction list, select word prediction, and then select the word "sunny" when it is highlighted. Although tediously slow, scanning is the only typing alternative for many users. There clearly is a need to speed up such scanning input methods.

Background on Other Recent Innovative Text Input Methods.

With the increasing availability of touch-screen displays, a number of novel text input methods have been created. One family of approaches required the user to perform taps, slides (i.e., point and drag a finger or stylus from character to character on a virtual keyboard), and gestures to communicate the characters in a word and then input the desired word by selecting it from a list of options or rejecting the word offered until the target word is offered (example product names include Swype, SwiftKey Flow, SwitpIt, SlideIT, TouchPal, and ShapeWriter). Hand writing or printing recognition in which a stylus is used on a touch screen is another approach. Dasher is another novel input method in which a user selects characters and words as they dynamically flow from in one direction. Fleksy is an alternative designed originally for the visually impaired that uses a virtual QWERTY keyboard and touch screen; users tap the screen where they think the target letters are and at the end of the word, it guesses the target word. A variety of innovative approaches to character selection continue to be developed and the process described herein is compatible with any of them.

Statement of the Problem: There is a Need for a Method that Reduces the Number of Physical Actions Required while Inputting Character Strings into Devices as Well as a Need to Assist People with Physical Mobility Disabilities Input Character Strings Faster and with Fewer Physical Actions.

There has been a dramatic increase in the number of electronic devices allowing or requiring text input and a large proportion of those devices are physically small. The standard "QWERTY" keyboard is still commonly used with such devices, either as a miniature hardware keyboard or as an on-screen "virtual" keyboard. However, the QWERTY keyboard was not designed for such applications and probably is being used because many people are already familiar with it. Pressing keys on a small QWERTY keyboard also requires a level of physical dexterity that many users do not possess. Many users with physical disabilities are not able to use even a standard keyboard, and must resort to assistive technology approaches such as "scanning keyboards" (as described above).

Clearly, there is a need for new or improved methods for inputting character strings. The process for inputting character strings described herein, is such a process in which rules about character selection are provided to the user and corresponding mechanisms are incorporated in the application program, device, or user interface which speed text input and reduce the number of physical actions required by the user. In one illustrative form of the invention, the rule provided to the user is to only select the consonants in a target word being inputted and a corresponding mechanism incorporated into the word search process (e.g., word prediction engine) which, for example, ignores the vowels in the members of a searched reference set of likely character strings and then presents likely matching candidates in a list for the user to select from. In another illustrative form of the invention, the rule provided to the user is to input the first character in the target word and then only select the consonants in that word along with a corresponding word search mechanisms. The primary problem with such an approach is that the language becomes more "compressed," which in some cases can result in too many duplicate representations to present to the user for selection in a reasonably sized list (e.g., six to nine options). To overcome that problem, other forms of the invention provide additional rules and corresponding mechanisms which assure that all words in the reference set of likely character strings have an opportunity to be presented to the user for selection. For example, providing a rule and corresponding search mechanism in which the user is instructed that if all the consonants in the target word have been inputted and the target word has not been offered in the list of options, and the target word ends in a vowel sound, then the terminal vowel or the final character should be selected. In another illustrative form of the invention, a rule provided to the user and corresponding search mechanism is that if all the consonants in a word have been selected and the target word has not been offered in the list of options, then the user is to select the first character in the word. In another form, in such cases the user is to select the first vowel in the target character string.

Tests were conducted, and the results presented herein, during which such forms of the invention were used to input words of intermediate likelihood of use. The results demonstrated that not only can these new processes reduce the number of physical actions required from a user, but they can significantly reduce the number of physical actions relative to the same word prediction engine when used in conventional mode (i.e., when the user sequentially inputs all characters in the target word until it is presented for selection in a list of likely options). In summary, forms of this invention should provide a significant benefit for any user inputting character strings, but especially should benefit users with physical disabilities.

BRIEF SUMMARY OF THE INVENTION

One primary object of the invention is to reduce the number of physical actions required by a user while inputting character strings to a device that requires or allows character strings to be inputted.

A second primary object of the invention is to increase the speed at which a user can input character strings into a device that requires or allows character strings to be inputted.

A third primary object of the invention is to increase the accuracy of the character strings inputted to a device that requires or allows text to be inputted.

A fourth primary object of the invention is to increase the number of physical actions required by a user when inputting character strings to a speech synthesizer for the purpose of allowing or augmenting aural communication.

A fifth primary object of the invention is to be compatible with all methods used for selecting characters including but not limited to a hardware keyboard or keypad; a software or virtual keyboard; a hardware or virtual keyboard with standard or unusual character sizes, locations, or layout; a scanning keyboard; speech recognition approach; written text recognition approach; printed text recognition approach; approaches utilizing taps, multiple taps, tapping strategies, input strategies utilizing the spatial relations of keys on a standard or nonstandard virtual keyboard, gestures, dragging a finger or stylus; touchtone telephone dial; application program that dynamically presents characters or words for selection based on their probability in the context of characters or words already selected for inputting; or any other device or application program which can be utilized to allow a user to select a character or characters to be inputted.

Another primary object of the invention is to provide the user with a rule or rules to apply when selecting the first character in a target character string and corresponding search mechanism or mechanisms which apply said rule or rules when searching a reference set of likely character strings to identify likely candidates to present to the user for possible selection.

Another primary object of the invention is to provide the user with a rule or rules to apply when selecting non-initial characters in a target character string and corresponding search mechanism or mechanisms which apply said rule or rules when searching a reference set of likely character strings to identify likely candidates to present to the user for possible selection.

Another object of the invention is to provide users with a rule that states they are to select only the consonants in a character string while inputting a target character string along with a corresponding search mechanism, and that the user is then to select the target character string for inputting when it appears in a list of likely candidates.

Another object of the invention is to provide users with a rule that states they are to select the first character and subsequently only the consonants in a character string while inputting a target character string along with a corresponding search mechanism, and that the user is then to select the target character string for inputting when it appears in a list of likely candidates.

Another object of the invention is to provide users with a rule or rules and corresponding search mechanism or mechanisms, which provide the user with additional options for displaying a target character string in the event that all the characters in the target string have been selected and it has not yet been displayed for selection.

Another object of the invention is to provide users with a rule that states that in the event all the consonants in the target character string have been selected but the target string has not been presented in the list of selectable candidates and the character string ends in a vowel sound, then the user may select the character or characters corresponding to the final vowel sound in which case more candidate strings are presented in the displayed list for possible selection along with a corresponding search mechanism.

Another object of the invention is to provide users with a rule that states that in the event all the consonants in the target character string have been selected but the target string has not been presented in the list of selectable candidates and the character string ends in a vowel sound, then the user may select the final character in the target string in which case more candidate strings are presented in the displayed list for possible selection along with a corresponding search mechanism.

Another object of the invention is to provide users with a rule that states that in the event that, given the rule or rules in effect, all the characters have been selected in the target character string but the target string has not been presented in the list of selectable candidates, then the user may select the initial character or characters, in which case more candidate strings are presented in the displayed list for possible selection along with a corresponding search mechanism.

Another object of the invention is to provide users with a rule that states that in the event that, given the rule or rules in effect, all the characters have been selected in the target character string but the target string has not been presented in the list of selectable candidates, then the user may select the initial vowel character, in which case more candidate strings are presented in the displayed list for possible selection along with a corresponding search mechanism.

Another object of the invention is to provide the user with a selectable mechanism with which upon selection at any point, currently displayed candidate character strings are removed from the display and additional candidate character strings are displayed for possible selection without the user selecting additional characters.

Another object of the invention is to provide the user with a variety of selectable options which, when selected, determine which rule or rules are to be applied in the process, so that a user may select the rule or rules that are the easiest for that person to remember and use.

Another object of the invention is to provide a mechanism by which the user can either select the exact character sequence in a target character string using standard word prediction, or may apply one or more of the rules and, in either case, be offered a list of likely candidate words.

Another object of the invention is that it is to be compatible with all methods for selecting characters including, but not limited to hardware keyboard or keypad; a software or virtual keyboard; a hardware or virtual keyboard with standard or unusual character sizes, locations, or layout; a scanning keyboard with standard or unusual character sizes, locations, or layout; speech recognition approach; written text recognition approach; printed text recognition approach; approaches utilizing taps, multiple taps, tapping strategies; input strategies utilizing the spatial relations of keys on a standard or nonstandard virtual keyboard, gestures, dragging a finger or stylus; touchtone telephone dial.

Another object of the invention is that identified likely character strings can be presented to the user for selection using a visual display, auditory display, or tactile display.

Another object of the invention is to provide the user which, upon selection, determines whether or not an additional trailing space is inputted following a selected character string.

Another object of the invention is to provide the user with an option which, upon selection, determines whether the most probable candidate character strings are presented alphabetically or in the order of their probability of being selected.

Another object of the invention is to provide the user with a hardware or virtual keyboard which is laid out so that the vowel characters are located together as a group and are separate from the consonant keys which also are together as a group.

Another object of the invention is to provide the user with a hardware or virtual keyboard which is laid out so that the consonant keys are arranged to minimize the probability that successively selected consonants are contiguously located.

Another object of the invention is to provide the user with a hardware or virtual keyboard with a layout in which the consonant keys that further increases the ease of use or speed of use of the current or selected rules.

Another object of the invention is to provide an option to the user which, by user selection, removes any characters selected since the last character string and resets the process.

Another object of the invention is to provide a mechanism which automatically resets the entire process that is activated when the user selects one of the displayed candidate character strings, after the final character in the character string has been automatically inputted, or after the user selects a space, Enter key, punctuation mark, reset option, or otherwise terminates the process, at which time the overall method is reset and prepared for the user's selection of the initial character of the next character string to be inputted.

Another object of the invention is to provide user an option wherein a conventional word-prediction search based on the actual character sequence in the specific target character string is conducted in addition to searches associated with said rules for selecting the initial character and searches corresponding and other active search mechanisms associated with said rules for selecting non-initial characters.

Another object of the invention is to provide the user with an improved method for inputting character strings for the purpose of text input or for speech generation.

In accordance with a preferred embodiment of the invention, a process for reducing the number of physical actions required by a user while inputting character strings into a device or application program capable of receiving character string input comprising the steps of: a) providing the user an input mechanism with which the user is able to select characters corresponding to those in the said character strings to be inputted; b) providing a candidate display list which presents identified candidate character strings to the user for possible selection to be inputted; c) providing the user a mechanism for selecting one of the said candidate character strings being displayed to be inputted; d) providing a mechanism which, following selection of a candidate character string from said candidate display list, inputs the selected character string into the device or application program into which the user is inputting character strings, removes or replaces any characters the user has already inputted while generating said list of candidate character strings which do not match the sequence of characters in the selected character string, and resets the overall process; e) providing a reference set of candidate character strings that the user is likely to be inputting; f) providing an index of probability of selection for each candidate character string in said set of candidate character strings with said index related to the probability of that character string being inputted; g) providing the user with one or more rules for selecting the initial character with said input mechanism when selecting the first character in the character string being inputted; h) providing the user with one or more rules for selecting non-initial characters with said input mechanism when inputting characters following the first character in the character string being inputted; i) providing a mechanism that identifies the initial character selected by the user with said input mechanism; j) providing an initial character search mechanism which, after the first character has been selected and identified, searches said reference set of candidate character strings and identifies a current subset of candidate character strings which have a correspondence to the initial character selected based on the currently active rules for selecting the initial character which have been provided to the user; k) providing a mechanism for ordering the said current subset of candidate character strings by their relative likelihood of being inputted based on the said index of probability of selection; l) providing a mechanism for displaying as many of the most probable candidate characters as possible in the space available in said candidate display list for possible selection by the user; m) providing a mechanism for identifying the next non-initial character selected by the user; n) providing a non-initial character search mechanism which, after the next non-initial character has been selected and identified, searches said current subset of candidate character strings or said reference set of candidate character strings and identifies an updated current subset of candidate character strings which have a correspondence to the string of characters selected to this point based on the rules for selecting characters provided to the user; o) providing a mechanism for ordering the said updated current subset of candidate character strings by their relative likelihood of being inputted based on the said index of probability of selection; p) providing a mechanism for displaying as many of the most probable candidate character strings as possible in the space available in said candidate display list for possible selection by the user; q) providing a user-selectable option for a mechanism which, if active, automatically inputs the next character in the event that the search process determines that there is only one character that follows the characters selected up until this point; r) repeating the method described in step "m" through step "q" until the system is reset; s) providing a mechanism for resetting the system that is activated when the user selects one of the displayed candidate character strings, after the final character in the character string has been automatically inputted, or after the user selects a space, Enter key, punctuation mark, reset option, or otherwise terminates the process, at which time the overall method is reset and prepared for the user's selection of the initial character of the next character string to be inputted.

Other objects and advantages of the present invention will become apparent from the following descriptions, wherein, by way of example, an embodiment of the present invention is disclosed.

BRIEF DESCRIPTION OF DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENT

Figure 1:
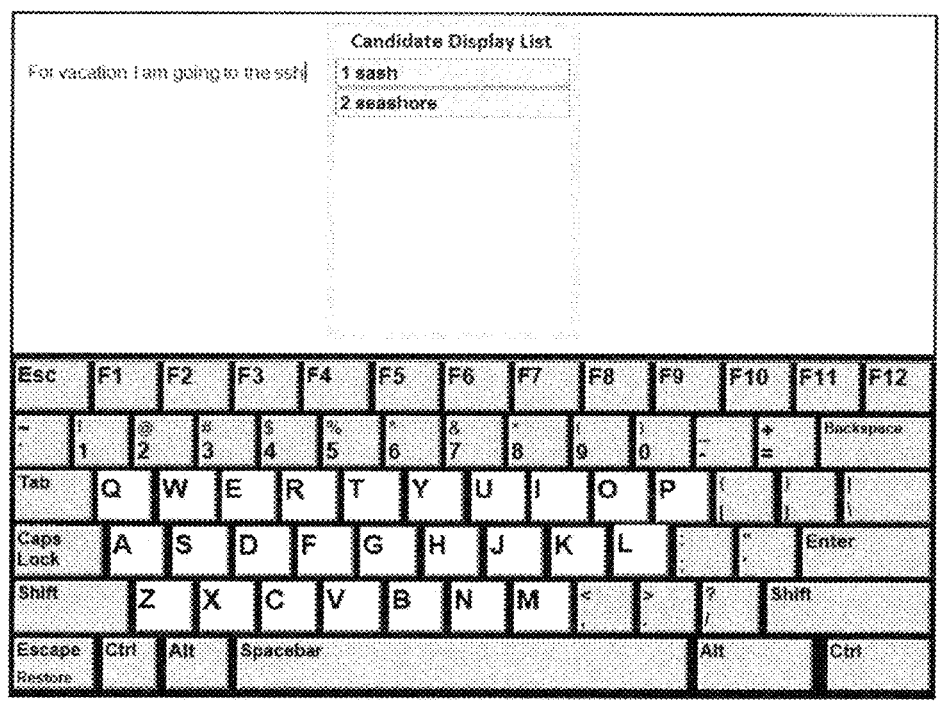
FIG. 1 shows a representative illustration of a screen display while using the invention. The user has already typed the words "For vacation I am going to the" using the depicted on-screen or hardware keyboard and has inputted the character sequence "ssh" because those are the initial consonants in the next target word "seashore." In the Candidate Display List window possible alternative words that correspond to "ssh" are displayed, and the user can replace the inputted "ssh" character sequence with the target word "seashore" by pointing and clicking on the word "seashore" in the candidate display window or by selecting the corresponding number "2" from the keyboard.

Detailed descriptions of the preferred embodiment are provided herein. It is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. As an illustrative example, the English language is used when presenting examples of how the invention works, but it would be clear to anyone skilled in the art that this invention could be applied to any language which divides its alphabetic symbols into two or more subsets, for example consonants and vowels, that are known to the user or could be taught to the user.

Increasing the speed of text input for the physically disabled population has always been a legitimate and important objective, but recent trends in technology have made this an important goal for the general population as well. The prevalence and power of hand-held devices requiring text input has increased over the past decade at an unprecedented rate. Tablet computers, smart phones, games, personal digital assistants (PDAs), and other portable devices requiring text input have typically utilized the traditional QWERTY keyboard as an interface for character input because traditional keyboards are still in use and the population is assumed to be familiar with the character layout of the QWERTY keyboard. However, that keyboard was designed to speed text input for an able bodied person using two hands and 10 fingers (i.e., touch typing), and, other than possibly being familiar to users, the layout of keys has no known beneficial relationship to speed of inputting text when a person uses one or two fingers to "hunt and peck" characters.

Word prediction is a common technology that had early usage in assistive technology for physically disabled users. Physically disabled typists could select the first few characters in a target word and, because the English language is structurally relatively shallow, have a good chance of being offered the targeted word—which, when selected, completed text input for that word. Many word prediction programs offer an option for automatically following the selected word with a space, which for a disabled user and over a number of words, can be very beneficial. Some programs also offer time/work saving punctuation tools; which, for example, if a period is selected, remove any previous spaces, input the period, input two subsequent spaces, and activate the Shift key so that the next letter is automatically capitalized. Such text inputting aids have become relevant tools for the general population due to the tiny QWERTY physical and virtual keyboards on many modern devices. One embodiment of the present invention capitalizes on existing word prediction technology, but modifies it in very specific and unusual ways. The present invention also depends on the cooperation of a fully informed user.

The goal of the present invention is to provide a method that reduces the number of characters selected by the user before a target word is offered for selection. Such a method will result in 1) reduced work for the user (i.e., fewer physical actions), and 2) faster text input. Toward that goal, the present method enrolls users in the procedure by providing them with simple rules that they are to apply while inputting words. The rules are complemented by mechanisms in the invention which decode the user's input and offer corresponding candidate character strings. For this approach to be successful, the rule(s) must be very simple to remember and apply. The following discussion assumes that the user is somewhat familiar with how different words are spelled.

One possible rule could be that the user is to select only the vowel letters in the "target" word being inputted. Most users are familiar with the distinction between vowels and consonants or could be taught that distinction, and most users are capable of discriminating the vowels in a word from the consonants in a word. A corresponding mechanism would be embedded in the word prediction process that searched for candidate character strings based on the vowel(s) selected, and offered those words which had the same pattern of vowels as that inputted by the user. If successful, this approach would reduce the number of actions required and possibly shorten the time before the target word is offered. The primary problem with this rule/mechanism is that the English language becomes too "compressed." The general obstacle that must be addressed in any such an approach is that, in order to be usable, the number of candidate words offered to the user in the word prediction candidate list should be small—limited both by the space available on the display and by the time it takes the user to cognitively process such a list (i.e., it would take a user more time to go through a list of 20 candidates than it would to simply continue typing the target word). The more the language is compressed, the more competition for the few candidate positions available (often four to nine candidates, but usually adjustable by the user). This dilemma is more problematic for short words than for longer words because as the number of characters inputted increases, short words are eliminated and the remaining possible candidates are more distinctive. The problem is the possibility that certain words would never be offered to the user, a problem which would occur more for short words than for long words. For example, in the current "type only the vowels" approach, typing an "a" for the target word "knob" would never offer the target word because there are so many other words that contain only one "o" vowel, and many of those words would be higher in probability than the target word (virtually all word prediction methods offer words based on their frequency of use). In summary, such an "only vowels" rule, while perhaps easy to remember and use, would not provide a useful approach because the compression from 26 characters to 6 vowels creates a situation where words never get offered. In addition, vowels often are not as clearly differentiated by users and can be phonetically confusable, for example, because of its possible sounds, the initial "a" in the word "again" could easily be confused by some poor spellers as a "u," or even as an "e" or "i" (due to different dialects and different levels of user sophistication). In summary, having users only input the vowels in a word is not a very promising strategy.

The strategy utilized in this invention instructs users to only input the consonants in a word. This is a more promising strategy because 1) there are 21 consonants, so while the English language gets compressed, it is not compressed to the extent that it would be if only vowels were inputted (i.e., all words are reduced to combinations of 21 consonants). Also, with notable exceptions, consonants are less likely to be confused (e.g., in the previous example, the "g" and "n" in "again" are less likely to be confused with other consonants because of their unique sounds). In addition, using consonants has an added potential benefit for poor spellers because many poor spellers tend to input the consonants in a word and omit the vowels.

While using the "consonants only" rule is more promising, there still are potential problems with short words. For example, when applying the "consonants only" rule while using a dictionary of the 18,640 most frequently used English words and presenting nine possible words to the user for selection, there are a total of 37 letter combinations that would result in more than nine candidates (i.e. one or more options besides the nine options presented to the user). Specifically, there are 1) five single-letter inputs (with the worst cases being the single letter "r" with 15 possible words (six words not presented to the user); 2) 27 two-letter inputs (with the worst case being "rs," with 16 possible words (seven words not offered to the user); and 3) five three-letter inputs (with the worst case being "brd," with 15 possible words (six words not offered). The preceding figures assume that the method provides a feature or option in which candidates associated with short input strings and for which the user has just inputted the final character, take priority over words with similar roots but which are not yet on their final character (e.g., if the user selects the single character "r," then all words, or as many as possible, that are associated with a single "r" get displayed, regardless of their probability of use, even if that means higher probability "r . . . " words are not displayed). Given this dictionary size and strategy, it is interesting to note that there are no input strings longer than three characters which could result in the user not being offered all associated candidate words. This general approach might not be as bad as i sounds—even without corrective action—because 1) the vast majority of words not offered are short words, which out of practicality, the user might prefer to simply input the entire strings rather than taking time to visually scan a list of options and then physically select one of them; and 2) if the user prefers to use this method for shorter words, then most word prediction interfaces offer a scroll option or comparable mechanism to display other candidate words lower in the list which are not currently visible. In addition, other rules and corresponding corrective mechanisms can be added to further reduce this potential problem.

One such rule and corresponding mechanism that could be included is that if the user has already inputted all of the consonants in the target word, but the target word still has not been offered, and the word ends in a vowel or vowel sound, then the user can then input the final letter in the target word or the final vowel sound (e.g., either "e" or "u" for the word "true"). Adding this mechanism to the consonants only method has the effect of reducing the "bottleneck" for short words. For example, given the same conditions as in the above example, adding these rules reduces and corresponding mechanisms reduces the number of problem words in the worst-case single consonant "r" situation from 15 words to 5 words, the worst-case double consonant "rs" from 16 words to 7 words, and the worst-case three consonant "brd" from 15 words to 14 words. While applying this mechanism does result in some "trickle up" (i.e., some of the 2-consonant encodings become part of the words requiring three inputs, etc.); nevertheless, the net result is a reduction in the short-word bottleneck.

Another rule that would be easy to remember and use, is that the user always inputs the first letter of a word, and a corresponding mechanism is added to the method to allow initial vowels to be included while searching for candidate words in the reference set of likely words. Given the same conditions as the above example, adding this rule reduces the above worst case single consonant "r" from 15 words to 1 word, the worst-case double consonant "rs" from 16 words to 4 words, and the worst-case three consonant "brd" from 15 words to 13 words. An overall analysis of the difference between having users input the first vowel or not revealed that when a user always inputs only consonants, then there are 78 incidents in which the list size exceeds nine, the maximum list length for such incidents is 20, the mean number of words not showing per incident is 2.8, and a total of 1.2% of the total words are implicated, but when a user always inputs the first letter (including vowels) followed by only consonants, then there are only 29 such incidents, the maximum list length for such incidents is 14, the mean number of words not showing per incident is 2.2, and a total of 0.3% of the total words are implicated. These analyses show that the net result of applying this simple rule is a reduction in the number of competing words with represented by short character strings. In addition, this rule (i.e., always start with the first letter) could possibly be more intuitive for many users than always starting with the first consonant. The "select the first character" rule only affects words which begin with a vowel, which, in the referenced standard dictionary used in these tests, constitutes only 17.7% of all the words.

To further reduce the bottleneck caused by compression, all beginning letter sequences which result in more candidate words than there are positions in the list offered to the user could be identified and the rule and corresponding mechanism added so that the user inputs the user inputs the initial character at the end of the entire sequence. Similarly, the user could be given a rule that, in the event all consonants have been selected and the target word has not been presented, to select the initial vowel characters or vowel sounds in the word, and corresponding mechanisms added to the search process. Using these approaches add enough diversity to the compressed words that there are very few or zero instances where words are not offered to the user in the list of candidate words (assuming a list of at least a three candidates). In the initial testing of this approach, an embodiment of the invention was created which incorporated the first of the above two rules, and it was found that the adjusted method could easily accommodate a standard dictionary of 18,640 words; that is, all words could be displayed by typing only the consonants in the word and, if the word had not yet appeared when the last consonant had been selected, it would appear when the user added the initial letter. That size dictionary is useful for many people (probably too large for a child—because it is undesirable to congest word prediction which words that are never used, and probably too small for sophisticated adult users). Decreasing the size of the dictionary should not cause any detrimental effect on the process described herein, and while increasing the size of the dictionary could increase congestion, the words added would be low-probability words, which tend to be longer, so the effects would be relatively small and offset by the rule "if the word has not appeared after inputting all the consonants, then input its first letter(s)," or the rule "if the word has not appeared after inputting all the consonants, then input its first vowel(s)."

Other rules and corresponding mechanisms can be applied to this general method, but it is important that 1) they be fairly intuitive to the user, 2) they be easy to remember, and 3) there are built-in or optional mechanisms that, in the event the user forgets to apply such rules, the process still provides a reasonable list of candidate character strings. Some such rules could be introduced for the purpose of further increasing the speed at which character strings are inputted rather than for the purpose of allowing the user to see all candidate words possible. For example, many words contain double consonants; instructing the user to input a single consonant in place of a double consonant further reduces the number of actions required by the user, increases speed, and could reduce a source of confusion for many users who are not perfect spellers (common spelling errors include using one consonant where there should be two or two when there should be one). This rule/mechanism is a good example of the need to provide flexibility so that, in this case, reasonable target words are offered if the user selects one consonant to represent two (applies the rule), or forgets and applies both consonants (fails to apply the rule).

One important aspect of the invention is that the above rules and corresponding methods can be applied separately or in different combinations. For example, one promising embodiment would employ the rules: 1) type only the consonants, 2) if the word contains two consecutive identical consonants, then only type one of them, 3) if you have finished all the consonants and the word still has not been offered and if the word ends in a vowel sound, type the last letter or type the letter for that sound, and 4) if all characters have been inputted and the word still is not offered, then sequentially input the vowels in the word. In this mode, the method would involve multiple simultaneous searches based on each rule, or a single search that incorporates all the rules involved. This approach is promising because it allows a user to consistently apply a set of rules to all words, the rules are simple to remember and use, and a reasonable amount of flexibility is provided because users can input double consonants as double consonants or as single consonants, and after all consonants have been selected, can select ending vowel sounds/letters or beginning vowel sounds/letters.

Another aspect of the invention is that consonants that are phonetically confusable can be included in the search mechanisms. For example, the graphemes "c," "k, "g," and "ck" can be phonetically identical and a source of common spelling errors. To assist users who are not perfect spellers, searches can be included for phonetically similar graphemes (e.g., when a user enters a "k," words with a "c" or a "ck" at that ordinal position are included in the search). Although there is no specific rule in this example, application of this mechanism would extend the usefulness of this invention for poor spellers. The above example is just one of numerous cases where phonetically similar consonant sounds are associated with different graphemes in the words. Any person skilled in the art is aware that many similar situations exist ranging from fairly obvious (e.g., b≈p, f≈v, j≈ch≈g, ph≈f, etc.) to less obvious (e.g., ch≈t, f≈gh, etc.). Use of the above specific example is not meant to imply that the invention is limited to those specific graphemes; rather, the method would include all such cases.

Another aspect of the invention is that the above rules could be applied as a standard set or as selected as alternative options selected by the user. With further use of this method, it could be discovered that a specific set of rules is most beneficial for most people and the most popular for most people; if so, then the rule set and corresponding search mechanisms could be standardized. However, there usually are vast differences among people with regard to what they prefer, what is simpler for them, etc., as well as a variety of different settings/situations in which the invention can be applied; if so, then mechanisms could be provided which offer the user the choice of which rule(s) they want to follow while using the method. Selection of different rules by the user would have the effect of modifying the corresponding search mechanisms used to identify and offer candidate character strings. In addition, it should be noted that more than one search mechanism could be simultaneously active and if so, could improve the usefulness of the invention without creating a significant problem or limitation for the underlying process. For example, the mechanism that is set for the rule "if the word begins with a vowel, type that vowel and then only input subsequent consonants" and the mechanism that is set for the rule "input only the consonants in the target word" can both be active and have very little effect on the outcome; this is because when an initial vowel is selected, that information not only greatly reduces the associated search space—a search space that is mutually exclusive from the space associated with an initial consonant, but it also can notify the system that the user has applied the "vowel-first" rule.

The overall goal of the invention is to reduce the corresponding number of actions required by the user, and hence increase input speed. To demonstrate that the invention does in fact reduce the number of characters, two tests were conducted. One test was designed to demonstrate the advantages of this new method over both standard typing and standard word prediction when the words being typed begin with consonants. The second test was to demonstrate the advantage of using this new method over both standard typing and standard word prediction when the first character in the target words were vowels; further, two alternative strategies were tested for the new method, one in which the user inputted the first letter (vowel) followed by successive consonants (e.g., for the word "about," then "abt" would be selected), and a second method in which the user inputted only consonants regardless of whether the first character was a vowel or a consonant (e.g., for the target word "about," then "bt" would be selected). The real question in these tests was not whether standard word prediction or the new method would be superior to standard typing; anyone skilled in the art is well aware that most word prediction methods can significantly reduce the number of characters inputted directly by the user. Rather, the more interesting questions here were 1) whether the new method is superior to word prediction, and 2) within the variants of the new method, for words beginning with a vowel, when inputting strings that begin with a vowel, whether using the "input only consonants" rule is superior to, no different from, or inferior to the "input the beginning vowel followed by the subsequent consonants" rule?

To conduct this test, a commercially available word prediction program called "SoothSayer" word prediction engine which was available to the inventor was used to represent standard word prediction search engines. Two optional features of this program were left active because both are beneficial with regard to reducing the number of characters inputted, and both are typically active by people who use this product. One feature is called "AutoType," which, given one or more characters have been inputted and the search engine reports there is only one character that follows that sequence, then that character is automatically inputted and the user notified. This mechanism is applied repeatedly until there are two or more possible characters or until a word is completed, the result being that words often are completed for the user automatically. The second feature is that a trailing space is automatically inputted following user selection of a word displayed in the list of candidates.

The test items for the first test were sets of 4-letter, 6-letter, and 8-letter words, each containing 100 consecutive words of intermediate probability when ordered first by frequency of use and then alphabetically (to create more homogeneous items, proper nouns and contractions were not included). The dependent measure was the number of physical actions required to input each target word and a trailing space while using the different test methods. Specifically, each word in the test lists was inputted using standard word prediction and the new method, and the number of actions required before the target word appeared in a list of nine options was totaled. In addition, for both word prediction and the new method, one action was added to represent the additional physical action required by the user (e.g., pointing and clicking on the target word or selecting it using keyboard input). The resulting number of actions required were averaged across all the test items from all three word lengths and results for standard word prediction and the new "consonants-only" method were compared with the constants 5, 7, and 9 for the 4-, 6-, and 8-letter words (respectively, with one added because of the automated trailing space). Results showed that the average number of actions saved per word was 2.55 for standard word prediction and 2.87 for the new method; the corresponding average percent of the word not having to be typed for standard word prediction was 33.73% and for the new method was 39.26% A pair-wise t-test comparing the percent savings for the new method compared with standard word prediction was highly significant ($p=3.69*E-16$), with the new method demonstrating superior work savings (i.e., significantly fewer actions required).

The second test was conducted to determine usefulness of the new method when inputting words that begin with a vowel. The primary questions here were whether the "beginning vowel followed by consonants" (Vowel>Consonants) method is superior to standard word prediction, whether the new "consonants only" (Consonants-Only) method is superior to standard word prediction, and whether there is any difference between the two methods, e.g., is the Consonants-Only method superior to the Vowel>Consonants method? The same general methodology was used as described above, but the sample size was reduced from 100 words to 50 words. Results indicated that the mean number of actions saved for standard word prediction was 2.81, for the Vowel>Consonants method was 2.93, and for the Consonants-Only method was 3.17. The corresponding mean percent of reduced actions standard word prediction was 37.96%, for the Vowel>Consonants method was 39.43%, and for the Consonants-Only method was 43.54%. The difference between standard word prediction and the Vowel>Consonants method was barely significant ($\alpha=0.05$, $p=0.027$); the difference between standard word prediction and the Consonants Only method was highly significant ($p=5.92*E-07$), and the difference between the two new methods utilized in this invention was highly significant ($p=6.97*E-05$), with the Consonants-Only method resulting in superior performance (i.e., significantly fewer actions required).

Overall, these tests confirm the advantages of the new methods utilized in the present invention over standard word prediction. In addition, there could be other advantages that derive from the present invention. For example, it is well known from the literature that one of the primary problems for standard word prediction is that, while it is generally recognized to be highly effective in saving keystrokes, people often do not use it. For whatever reason, they continue to input all the characters even though the target word is offered in the list of candidates. One explanation is that users get "stuck" in the mode of inputting characters in their correct order (i.e., standard typing), and forget to, or simply choose not to watch the word prediction options being presented. The cognitive-motor repetitive chained behavior of mentally determining the next letter in a word and then translating that output to a specific motor response (keyboard action) is well ingrained in most keyboard users and probably difficult to break out of. Also, at some point in the process of typing a word it is faster to just continue typing and complete the word than it is to interrupt typing, look through the list of candidate words, and select the target word. One possible indirect advantage for the new process described herein is that it is different enough from the standard text-input method that it might be more easily interrupted with the visual scanning task. Indeed, it does take a conscious effort to use these new methods; and once adopted, the user is dependent on finding the target word in the list of options in order to input the word. For example, to just continue typing after "dbr" has been inputted is not a viable option—the user is committed to applying the new method at this point. Unlike standard word prediction, where a user has the option of disregarding the word list and just continue typing, the new method requires the user to detect and input the word using the list of word options. It is suggested here that this characteristic, which might on the surface appear to be a disadvantage, could be an advantage in overcoming the most common problem with standard word prediction, that it simply is not used to its full potential. It also becomes apparent that a "Clear," "Undo," or "Start Over" option would be desirable so that a user can quickly remove all characters already selected in the event that the target word is not found, saving the user having to backspace/delete them.

Another aspect of the invention is that, in addition to custom searches as defined by the rules noted above, standard dictionary searches can be conducted simultaneously with very little overlap between the two searches because there is very little in common between the set of text strings in a standard dictionary and the corresponding set of text strings in the same standard dictionary but containing no vowels (or only vowels at the beginning or end of a string of consonants). This is a very desirable trait, because it means that users could switch strategies "on the fly," without having to make changes to settings. For example, applying the Consonants-Only method with standard word prediction searches or with Vowel>Consonant searches does not congest the word prediction engine as one might expect. The reason is that the structure of the two searched sets of words (i.e., words containing or not containing their vowels) is very different than standard words—beginning a character string with "bd" immediately eliminates all common words which contain vowels and beginning a character string with "ea" immediately eliminates all words defined by the "consonants only" rule. Having more than one search method active at the same time could be useful for someone who is not well skilled in applying such rules or by someone who is very skilled, and wants to be able to switch strategies without changing settings. Combining such methods does not necessarily cause significant issues for this invention or for the user.

In addition, the present method could be combined with any current or future input methods to further increase speed. For example, people able to use touch screen methods such as those described above in which a person uses a finger or stylus to drag through the locations of the letters of a word, when combined with this new method, could drag through the consonants of the word instead of all letters, further saving time and increasing the speed of inputting characters. In addition, the layout of the physical or virtual keyboard could be changed from the standard QWERTY layout, to maximize the accuracy of combining this new method with earlier methods. For example, the vowels could be located at a distance from the consonants. On a physical or virtual keyboard, the consonants could be arranged based on their sequential frequency, with more space between two consonants likely to follow each other and less space between two consonants unlikely to follow each other (because identifying which key is intended is always a problem/challenge for small keyboards).

In this invention, the methods corresponding to the rules in effect can be embedded in a stand-alone word prediction program or in the control system (e.g., software or firmware) of a device that requires/allows character input. For example, when implementing the method used for the primary consonants-only rule, the control program would search for the consonants in a dictionary of possible words, ignoring all vowels; and methods corresponding to other rules similarly implemented. Another approach of implementing this method is to use standard word prediction lookup procedures, whether in a stand-alone program or embedded in the control system of a device, and embed the rules in the encodings, exploiting abbreviation expansion as described above.

Illustrative Examples of the Invention

One example of how the invention would be used by and useful to the non-physically-disabled population is a person inputting text into a tablet computer or phone using a touch screen to select characters from a virtual keyboard. As discussed above, a standard QWERTY keyboard was not designed for such use, and the user could experience difficulty and frustration. Certainly, input would be less efficient and slower than, for example, using touch typing on a standard keyboard. In this example, the user would input characters based on the active rules, illustratively, inputting only consonants of the target word. As described above, the number of actions required to input words using the new method would be, on the average, fewer than when inputting all the characters directly, and is likely to be even faster and require fewer actions than when using standard word prediction (with selection of the target word included as an action). Also, the user is not bound to always use this new method; for example, the user always can input the actual characters in a target word and then select it when standard word prediction offers it or simply input all the characters in the target word.

A second illustrative example involves a physically disabled user who is inputting text into any device using any input method (e.g., a touch screen as in the previous example, a standard hardware keyboard, a virtual keyboard using scanning technique, etc.). As described above, using a dichotomous switch and a scanning method in conjunction with a virtual keyboard can be extremely time consuming and boring (much of the time is spent waiting for the desired character to be offered). Selecting only the consonants in a word could, as demonstrated above, could save this person considerable time and effort (making a "simple" dichotomous response often can be very difficult for such users). In addition, such users could benefit greatly from custom virtual keyboards, as described above. In this case, the keys could be spatially arranged to maximize their frequency of use (which could be substantially different from a standard QWERTY keyboard or even a standard frequency-of-use keyboard layout—e.g., the letter "n" would move from the 18$^{th}$ scanning position on a standard frequency-based keyboard to the 4$^{th}$ position when using this invention because there are a large number of words in which the letter "n" follows an initial vowel or vowels). In addition, the vowels could be at a different location and only offered as appropriate to the sequential context. Use of such a virtual keyboard in conjunction with the invention could further increase the speed of text input for people using scanning because in addition to arranging the order to increase speed, users would not have to waste time scanning through vowel keys (which they would have to do if using a standard QWERTY keyboard).

Figure 2:
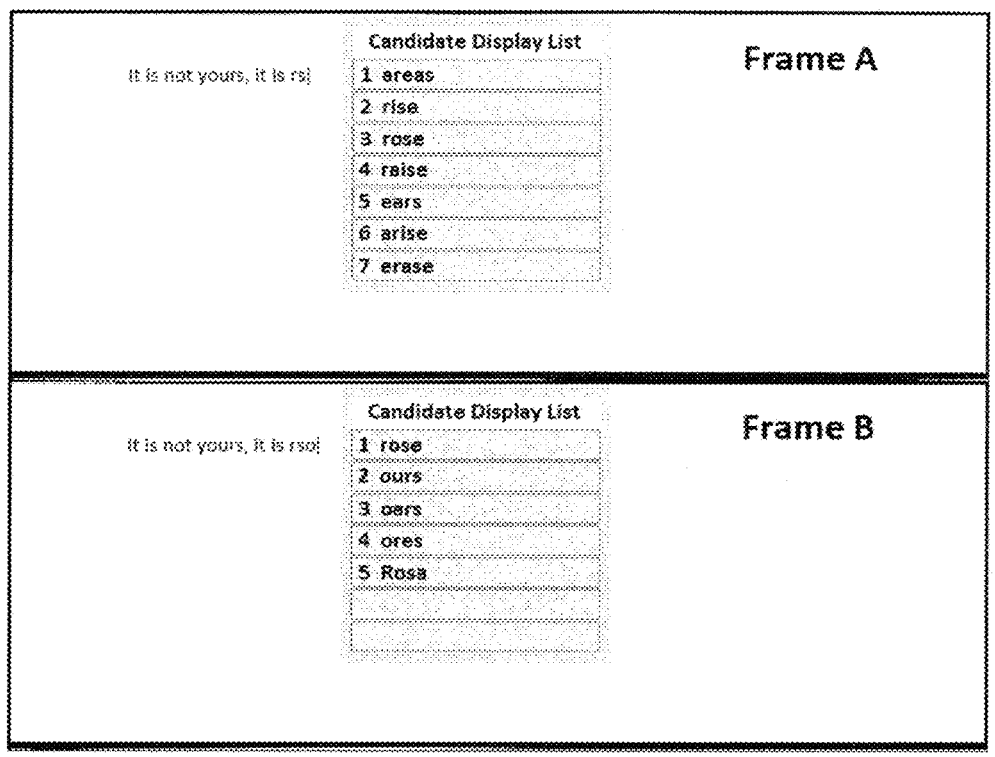
FIG. 2 Frame A provides an example in which the user wants to type "ours" but after selecting "rs," the target word is not offered because there are too many high-probability words with the same "rs" encoding to offer in a list of reasonable length. To overcome such events, the user is instructed to input the first vowel, which is shown in Frame B and which produces the target word "ours" for selection.

FIGS. 1 and 2 provide additional illustrative examples.

SUMMARY

There are different forms of the invention depending on which rules and corresponding mechanisms are active. The general common rule/mechanism is that the user inputs the consonants of a word instead of all the letters in the word. Other rules/mechanisms include selecting the first letter in the word before inputting subsequent consonants; selecting one consonant in place of double consonants; if the word has not appeared after inputting all consonants, select the last character in the character string or select the character or character(s) that actually or phonetically correspond to the ending vowel sound; if the word has not appeared after inputting all consonants, select the initial vowel character or character(s) in the target string or the character(s) that phonetically represent the initial vowel sounds in the target string; always input the first character(s) in the word; when selecting consonants, select any character or characters that are phonetically similar to the consonants in the target character string. These rules can be applied separately, or in any combination, as well as simultaneously with standard word prediction (i.e., in which the user inputs the exact characters in the exact sequence). All forms provide the user of this new method an opportunity for not only inputting text with fewer actions than when using a keyboard alone, but also foe inputting of text with fewer actions than when using a conventional word prediction program. Also, an optional mechanism is provided with which the user can quickly and easily reset the process, removing any characters which have been inputted and resetting the active mechanisms.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for reducing the number of physical actions required by a user while inputting character strings into a device or application program capable of receiving character string input comprising the steps of:
    a) providing the user an input mechanism with which the user is able to select characters corresponding to those in the said character strings to be inputted;
    b) providing a candidate display list which presents identified candidate character strings to the user for possible selection to be inputted;
    c) providing the user a mechanism for selecting a character string from the said candidate character strings being displayed for possible inputting;
    d) providing a reference set of candidate character strings that the user is likely to be inputting;
    e) providing an index of probability of selection for each candidate character string in said set of candidate character strings with said index related to the probability of that character string being inputted;
    f) providing the user the instruction that when inputting a target character string the user is to first input the initial character of the target character string to be inputted using said input mechanism and to use said mechanism for selecting a character string when the target character string is displayed in said candidate display list;
    g) providing a mechanism that identifies the initial character selected by the user;
    h) providing an initial character search mechanism which, after the first character has been selected and identified, searches said reference set of candidate character strings and identifies a current subset of candidate character strings which have a correspondence to the initial character selected;
    i) providing a mechanism for ordering the said current subset of candidate character strings by their relative likelihood of being inputted based on the said index of probability of selection;
    j) providing a mechanism for displaying as many of the ordered most probable candidate character strings as possible in the space available in said candidate display list for possible selection by the user;
    k) providing the user the instruction that when the target character string is not presented for selection following selection of the initial character then the user is to sequentially input only the non-initial consonants in the target character string and select the target character string when it is presented in said candidate display list by using said mechanism for selecting a character string;
    l) providing the user the instruction that when the target character string is not presented for selection after the initial character and after all of the subsequent non-initial consonants in the target character string have been selected the user is then to select the initial vowel in the target character string and select the target character string when it is presented in said candidate display list by using said mechanism for selecting a character string;
    m) providing the user the instruction that when the target character string is not presented for selection after the initial character and after all of the subsequent non-initial consonants and after the initial vowel in the target character string have been selected the user is then to select the final character in the target character string and select the target character string when it is presented in said candidate display list by using said mechanism for selecting a character string;
    n) providing a mechanism for identifying each non-initial character as it is selected by the user;
    o) providing a non-initial character search mechanism which, after each non-initial character has been selected and identified searches said current subset of candidate character strings or said reference set of candidate character strings and identifies an updated current subset of candidate character strings which have a correspondence to the string of characters selected to that point;

p) providing a mechanism for ordering each of the said updated current subsets of candidate character strings as they are updated based on the relative likelihood of their being selected as indexed by their said index of probability of selection;

q) providing a mechanism for updating said candidate display list as each character is selected and which displays as many of the ordered most probable candidate character strings as possible in the space available in the candidate display list for possible selection by the user.

2. A process for reducing the number of physical actions required by a user while inputting character strings into a device or application program capable of receiving character string input comprising the steps of:

a) providing the user an input mechanism with which the user is able to select characters corresponding to those in the said character strings to be inputted;

b) providing a candidate display list which presents identified candidate character strings to the user for possible selection to be inputted;

c) providing the user a mechanism for selecting a character string from the said candidate character strings being displayed for possible inputting;

d) providing a reference set of candidate character strings that the user is likely to be inputting;

e) providing an index of probability of selection for each candidate character string in said set of candidate character strings with said index related to the probability of that character string being inputted;

f) providing the user the instruction that when inputting a target character string the user is to first input the initial consonant of the target character string to be inputted using said input mechanism and to use said mechanism for selecting a character string when the target character string is displayed in said candidate display list;

g) providing a mechanism that identifies the initial consonant selected by the user;

h) providing an initial consonant search mechanism which, after the initial consonant has been selected and identified, searches said reference set of candidate character strings and identifies a current subset of candidate character strings which have a correspondence to the initial consonant selected;

i) providing a mechanism for ordering the said current subset of candidate character strings by their relative likelihood of being inputted based on the said index of probability of selection;

j) providing a mechanism for displaying as many of the ordered most probable candidate character strings as possible in the space available in said candidate display list for possible selection by the user;

k) providing the user the instruction that when the target character string is not presented for selection following selection of the initial consonant then the user is to sequentially input only the non-initial consonants in the target character string and select the target character string when it is presented in said candidate display list by using said mechanism for selecting a character string;

l) providing the user the instruction that when the target character string is not presented for selection after the initial consonant and after all of the subsequent non-initial consonants in the target character string have been selected the user is then to select the initial vowel in the target character string and select the target character string when it is presented in said candidate display list by using said mechanism for selecting a character string;

m) providing the user the instruction that when the target character string is not presented for selection after the initial consonant and after all of the subsequent non-initial consonants and after the initial vowel in the target character string have been selected the user is then to select the final character in the target character string and select the target character string when it is presented in said candidate display list by using said mechanism for selecting a character string;

n) providing a mechanism for identifying each non-initial character as it is selected by the user;

o) providing a non-initial character search mechanism which, after each non-initial character has been selected and identified searches said current subset of candidate character strings or said reference set of candidate character strings and identifies an updated current subset of candidate character strings which have a correspondence to the string of characters selected to that point;

p) providing a mechanism for ordering each of the said updated current subsets of candidate character strings as they are updated based on the relative likelihood of their being selected as indexed by their said index of probability of selection;

q) providing a mechanism for updating said candidate display list as each character is selected and which displays as many of the ordered most probable candidate character strings as possible in the space available in the candidate display list for possible selection by the user.

3. A process for reducing the number of physical actions required by a user while inputting character strings into a device or application program capable of receiving character string input comprising the steps of:

a) providing the user an input mechanism with which the user is able to select characters corresponding to those in the said character strings to be inputted;

b) providing a candidate display list which presents identified candidate character strings to the user for possible selection to be inputted;

c) providing the user a mechanism for selecting a character string from the said candidate character strings being displayed for possible inputting;

d) providing a reference set of candidate character strings that the user is likely to be inputting;

e) providing an index of probability of selection for each candidate character string in said set of candidate character strings with said index related to the probability of that character string being inputted;

f) providing the user the instruction that when inputting a target character string the user is to first input the initial two characters of the target character string to be inputted using said input mechanism and to use said mechanism for selecting a character string when the target character string is displayed in said candidate display list;

g) providing a mechanism that identifies each of the two initial characters selected by the user;

h) providing an initial character search mechanism which, after each of the first two characters has been selected and identified, searches said reference set of candidate character strings and identifies a current subset of candidate character strings which have a correspondence to the initial character selected;

i) providing a mechanism for ordering the said current subset of candidate character strings by their relative likelihood of being inputted based on the said index of probability of selection;

j) providing a mechanism for displaying as many of the ordered most probable candidate character strings as possible in the space available in said candidate display list for possible selection by the user;

k) providing the user the instruction that when the target character string is not presented for selection following selection of the initial two characters then the user is to sequentially input only the subsequent non-initial consonants in the target character string and select the target character string when it is presented in said candidate display list by using said mechanism for selecting a character string;

l) providing the user the instruction that when the target character string is not presented for selection after the initial two characters and after all of the subsequent non-initial consonants in the target character string have been selected the user is then to select the first vowel in the target character string and select the target character string when it is presented in said candidate display list by using said mechanism for selecting a character string;

m) providing the user the instruction that when the target character string is not presented for selection after the initial two characters and after all of the subsequent non-initial consonants and after the initial vowel in the target character string have been selected the user is then to select the final consonant in the target character string and select the target character string when it is presented in said candidate display list by using said mechanism for selecting a character string;

n) providing a mechanism for identifying each non-initial character that follows the first two characters as it is selected by the user;

o) providing a search mechanism for each non-initial character that follows the first two characters which, after each such non-initial character has been selected and identified searches said current subset of candidate character strings or said reference set of candidate character strings and identifies an updated current subset of candidate character strings which have a correspondence to the string of characters selected to that point;

p) providing a mechanism for ordering each of the said updated current subsets of candidate character strings as they are updated based on the relative likelihood of their being selected as indexed by their said index of probability of selection;

q) providing a mechanism for updating said candidate display list as each character is selected and which displays as many of the ordered most probable candidate character strings as possible in the space available in the candidate display list for possible selection by the user.

* * * * *